United States Patent
Bian

(10) Patent No.: US 12,416,821 B2
(45) Date of Patent: Sep. 16, 2025

(54) PLASMONIC PHOTONIC STRUCTURES INCLUDING A LAYER THAT EXHIBITS AN ELECTRIC-FIELD-INDUCED POCKELS EFFECT

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 309 days.

(21) Appl. No.: 18/212,437

(22) Filed: Jun. 21, 2023

(65) Prior Publication Data

US 2024/0427177 A1 Dec. 26, 2024

(51) Int. Cl.
*G02B 6/122* (2006.01)
*G02F 1/015* (2006.01)
*G02F 1/035* (2006.01)
*G02F 1/313* (2006.01)

(52) U.S. Cl.
CPC ......... *G02F 1/0154* (2021.01); *G02B 6/1226* (2013.01); *G02F 1/035* (2013.01); *G02F 1/3132* (2013.01); *G02F 2201/063* (2013.01); *G02F 2202/20* (2013.01); *G02F 2203/10* (2013.01)

(58) Field of Classification Search
CPC ...... G02F 1/0154; G02F 1/035; G02F 1/3132; G02F 2201/063; G02F 2202/20; G02F 2203/10; G02B 6/1226
USPC .................................. 385/1–3, 9, 14, 28, 30
See application file for complete search history.

(56) References Cited

U.S. PATENT DOCUMENTS

| | | | | |
|---|---|---|---|---|
| 2003/0223668 A1* | 12/2003 | Breukelaar | ............ | G02F 1/035 385/2 |
| 2010/0310205 A1* | 12/2010 | Liu | ........ | B82Y 20/00 385/12 |
| 2018/0081204 A1* | 3/2018 | Ma | ........ | G02F 1/0027 |
| 2023/0324610 A1* | 10/2023 | Reano | ........ | G02F 1/035 385/14 |

OTHER PUBLICATIONS

"Structurally-tolerant vertical directional coupling between metal-insulator-metal plasmonic waveguide and silicon dielectric waveguide" by Li et al, Optics Express, vol. 18, No. 15, pp. 15531-15543 (Year: 2010).*

"Electro-Optic Plasmonic Modulator With Direct Coupling to Silicon Waveguides" by Mohamed et al, IEEE Photonics Journal, vol. 9, No. 6, paper 4502807 (Year: 2017).*

"Vertical coupling characteristics between hybrid plasmonic slot waveguide and Si waveguide" by Choi et al, Optics Communications, vol. 285, pp. 3735-3739 (Year: 2012).*

(Continued)

*Primary Examiner* — Robert Tavlykaev
(74) *Attorney, Agent, or Firm* — Thompson Hine LLP; Anthony Canale

(57) ABSTRACT

Plasmonic photonic structures that include a layer that exhibits an electric-field-induced Pockels effect and methods of forming such structures. The structure comprises a waveguide core on a substrate, a first layer that has an overlapping relationship with the first waveguide core, and a second layer that has an overlapping relationship with the first waveguide core and the first layer. The first layer comprises a metal, and the second layer comprising a material that exhibits an electric-field-induced Pockels effect.

16 Claims, 13 Drawing Sheets

(56) References Cited

OTHER PUBLICATIONS

"Hybrid plasmonic electro-optical modulator" by Zaki et al, Appl. Phys. A, v. 122, paper 472 (Year: 2016).*

"Vertical Directional Couplers With Ultra-Short Coupling Length Based on Hybrid Plasmonic Waveguides" by Du et al, Journal of Lightwave Technology, vol. 32, No. 11, pp. 2065-2071 (Year: 2014).*

"Plasmonic-organic hybrid electro/optic Mach-Zehnder modulators: from waveguide to multiphysics modal-FDTD modeling" by Tibaldi et al, Optics Express, vol. 28, No. 20, pp. 29253-29271 (Year: 2020).*

Thomaschewski, M. et al., "Plasmonic Lithium Niobate Mach-Zehnder Modulators." Nano Letter 2022, 22, 16, 6471-6475, Publication Date:Aug. 11, 2022, https://doi.org/10.1021/acs.nanolett.2c00714.

Thomaschewski, M., Zenin, V.A., Wolff, C. et al. Plasmonic monolithic lithium niobate directional coupler switches. Nature Communications 11, Article No. 748 (2020). https://doi.org/10.1038/s41467-020-14539-y.

He, M., Xu, M., Ren, Y. et al. High-performance hybrid silicon and lithium niobate Mach-Zehnder modulators for 100 Gbit s-1 and beyond. Nat. Photonics 13, 359-364 (2019). https://doi.org/10.1038/s41566-019-0378-6.

Valdez, F., Mere, V., Wang, X. et al. 1"10 GHZ, 110 mW hybrid silicon-lithium niobate Mach-Zehnder modulator." Scientific Reports 12, 18611 (2022). https://doi.org/10.1038/s41598-022-23403-6.

Nicholas Boynton et al., "A heterogeneously integrated silicon photonic/lithium niobate travelling wave electro-optic modulator," Optics Express 28, 1868-1884 (2020).

Daoxin Dai and Sailing He, "A silicon-based hybrid plasmonic waveguide with a metal cap for a nano-scale light confinement," Optics Express 17, 16646-16653 (2009).

Yusheng Bian, Zheng Zheng, Xin Zhao, Jinsong Zhu, and Tao Zhou, "Symmetric hybrid surface plasmon polariton waveguides for 3D photonic integration," Optics Express 17, 21320-21325 (2009).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

Y. Bian et al., "Integrated Laser Attach Technology on a Monolithic Silicon Photonics Platform," 2021 IEEE 71st Electronic Components and Technology Conference (ECTC), San Diego, CA, USA, 2021, pp. 237-244, doi: 10.1109/ECTC32696.2021.00048.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

Bian, Yusheng, "Photonics Chip Structures Including an Edge Coupler and a Layer Exhibiting an Electric-Field-Induced Pockels Effect" filed Jun. 14, 2023 as a U.S. Appl. No. 18/209,680.

* cited by examiner

PLASMONIC PHOTONIC STRUCTURES INCLUDING A LAYER THAT EXHIBITS AN ELECTRIC-FIELD-INDUCED POCKELS EFFECT

BACKGROUND

The disclosure relates to photonics chips and, more specifically, to plasmonic photonic structures that include a layer that exhibits an electric-field-induced Pockels effect and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as an optical fiber or a laser.

Thin film lithium niobate (TFLN) may be integrated into a photonic component. Lithium niobate is an electro-optical material characterized by optical properties, such as large second-order nonlinearity, a wide transparency window, and low nonlinear absorption, that are favorable for certain types of photonic components. Photonic components including a TFLN layer may suffer from several disadvantages, such as a large footprint and a limited power handling capability.

Improved plasmonic photonic structures that include a layer that exhibits an electric-field-induced Pockels effect and methods of forming such structures are needed.

SUMMARY

In an embodiment of the invention, a structure for a photonics chip is provided. The structure comprises a waveguide core on a substrate, a first layer that has an overlapping relationship with the first waveguide core, and a second layer that has an overlapping relationship with the first waveguide core and the first layer. The first layer comprises a metal, and the second layer comprising a material that exhibits an electric-field-induced Pockels effect.

In an embodiment of the invention, a method of forming a photonics chip is provided. The method comprises forming a waveguide core on a substrate, forming a first layer that has an overlapping relationship with the waveguide core, and forming a second layer that has an overlapping relationship with the waveguide core and the first layer. The first layer comprises a metal, and the second layer comprises a material that exhibits an electric-field-induced Pockels effect.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
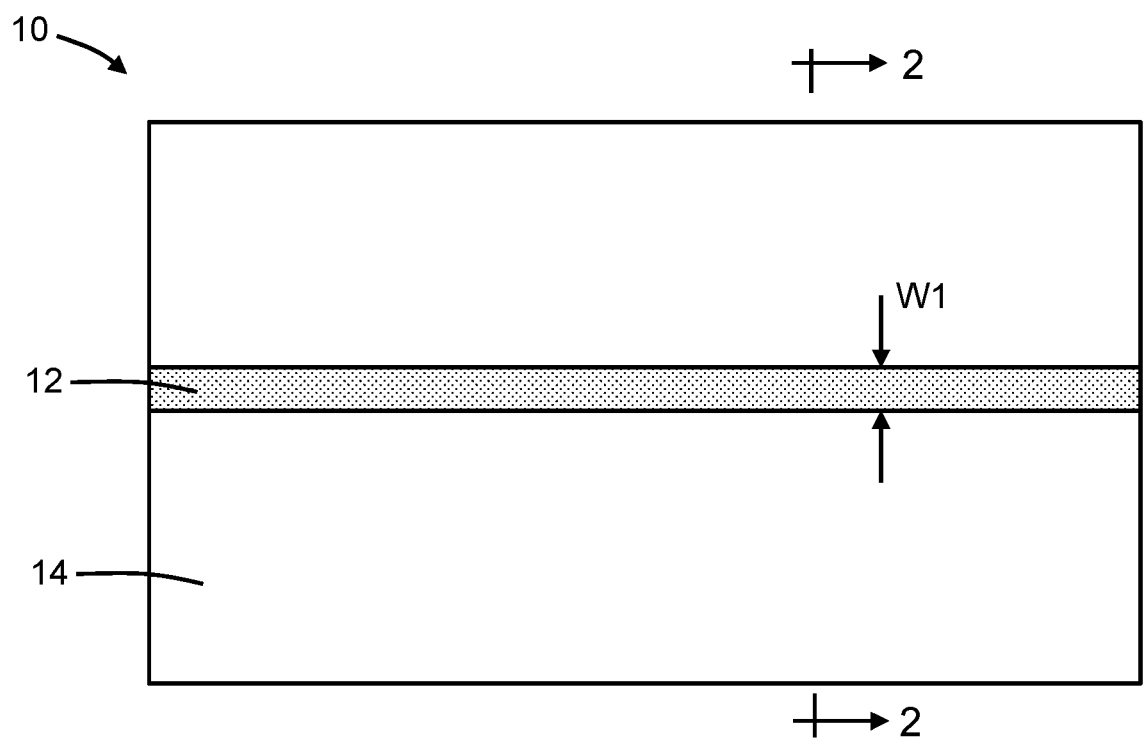
FIG. 1 is a top view of a structure at an initial fabrication stage of a processing method in accordance with embodiments of the invention.
Figure 2:
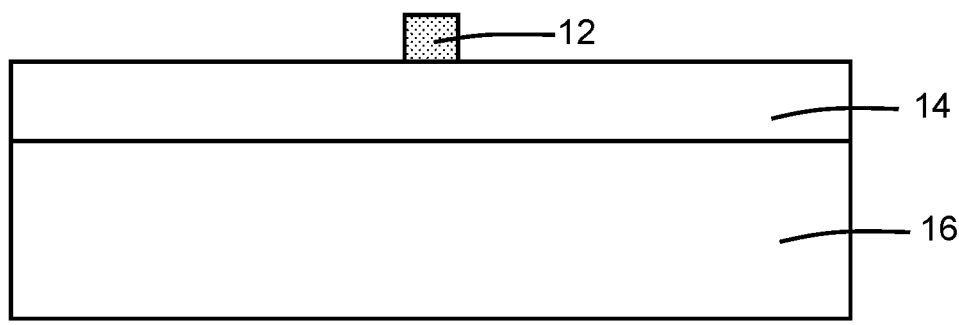
FIG. 2 is a cross-sectional view taken generally along line 2-2 in FIG. 1.

With reference to FIGS. 1, 2 and in accordance with embodiments of the invention, a structure 10 for a photonics chip includes a waveguide core 12 that is disposed on, and over, a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate. The waveguide core 12 is separated from the substrate 16 by the dielectric material of the intervening dielectric layer 14. In an alternative embodiment, one or more additional dielectric layers comprised of, for example, silicon dioxide may be disposed between the waveguide core 12 and the upper surface of the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon, amorphous silicon, or polysilicon. In an alternative embodiment, the waveguide core 12 may be comprised of a dielectric material, such as silicon nitride, silicon oxynitride, or aluminum nitride. In alternative embodiments, other materials, such as a III-V compound semiconductor, may be used to form the waveguide core 12.

In an embodiment, the waveguide core 12 may be formed by patterning a layer with lithography and etching processes. In an embodiment, an etch mask may be formed by a lithography process over the layer, and unmasked sections of the layer may be etched and removed with an etching process. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer comprised of its constituent material (e.g., silicon nitride). The waveguide core 12 may extend lengthwise along a longitudinal axis 15. The waveguide core 12 may have a width W1 in a direction transverse to the longitudinal axis 15.

Figure 3:
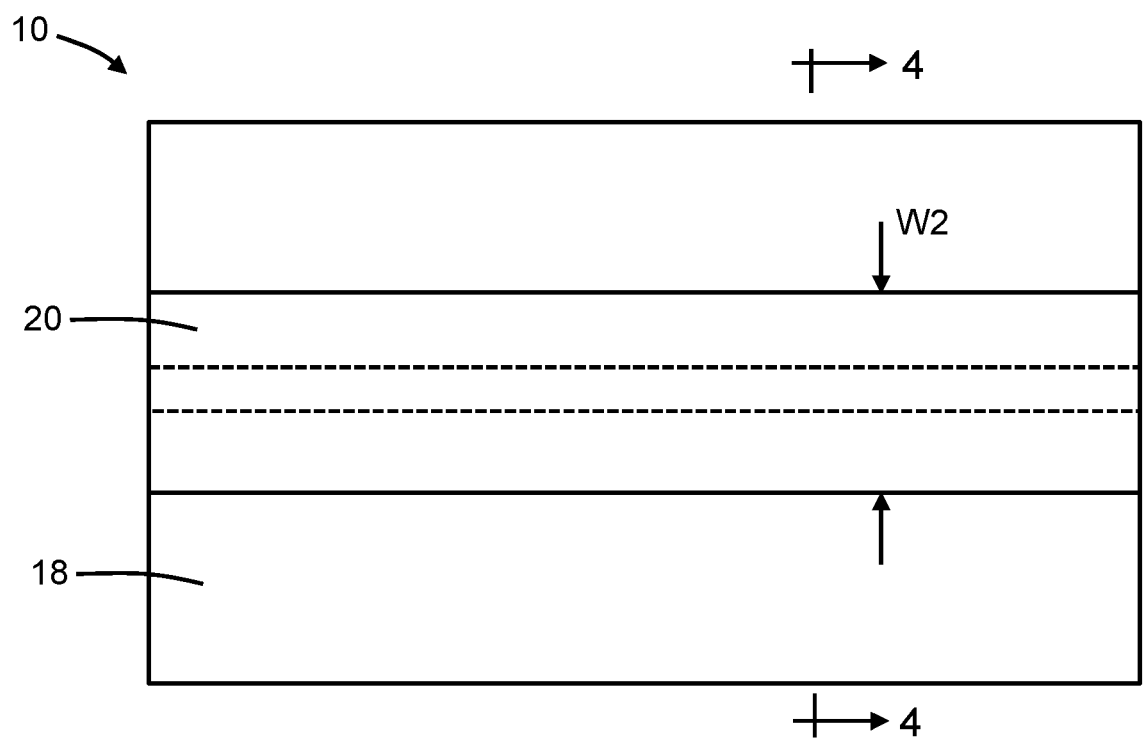
FIG. 3 is a top view of the structure at a fabrication stage of the processing method subsequent to FIGS. 1, 2.
Figure 4:
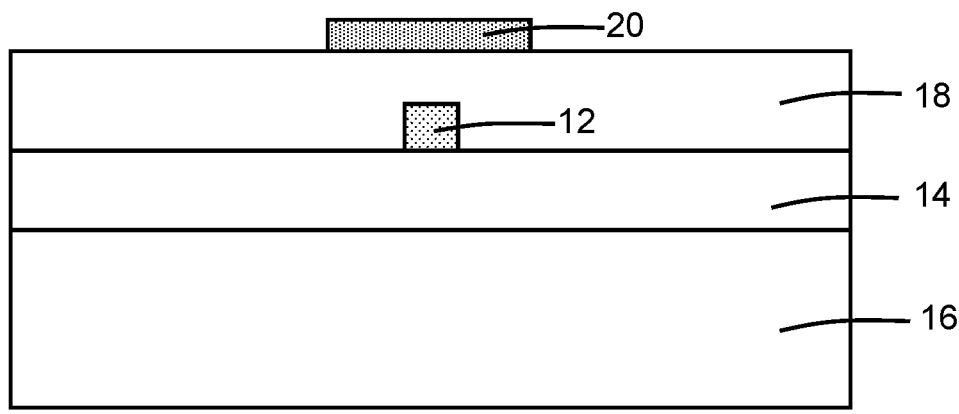
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 18 may be formed over the waveguide core 12. The dielectric layer 18 may be comprised of a dielectric material, such as silicon dioxide. The waveguide core 12 may be embedded in the dielectric material of the dielectric layer 18.

A metal layer 20 may be formed on, and over, the dielectric layer 18. In an embodiment, the metal layer 20 may be comprised of a metal, such as copper or aluminum, that is compatible with complementary-metal-oxide-semiconductor processes. In an alternative embodiment, the metal layer 20 may be comprised of a metal, such as gold or silver, that is incompatible with complementary-metal-oxide-semiconductor processes. In an embodiment, the metal layer 20 may be deposited and patterned by lithography and etching processes. In an embodiment, the metal layer 20 may have a width W2 that is greater than the width W1 of the waveguide core 12.

Figure 5:
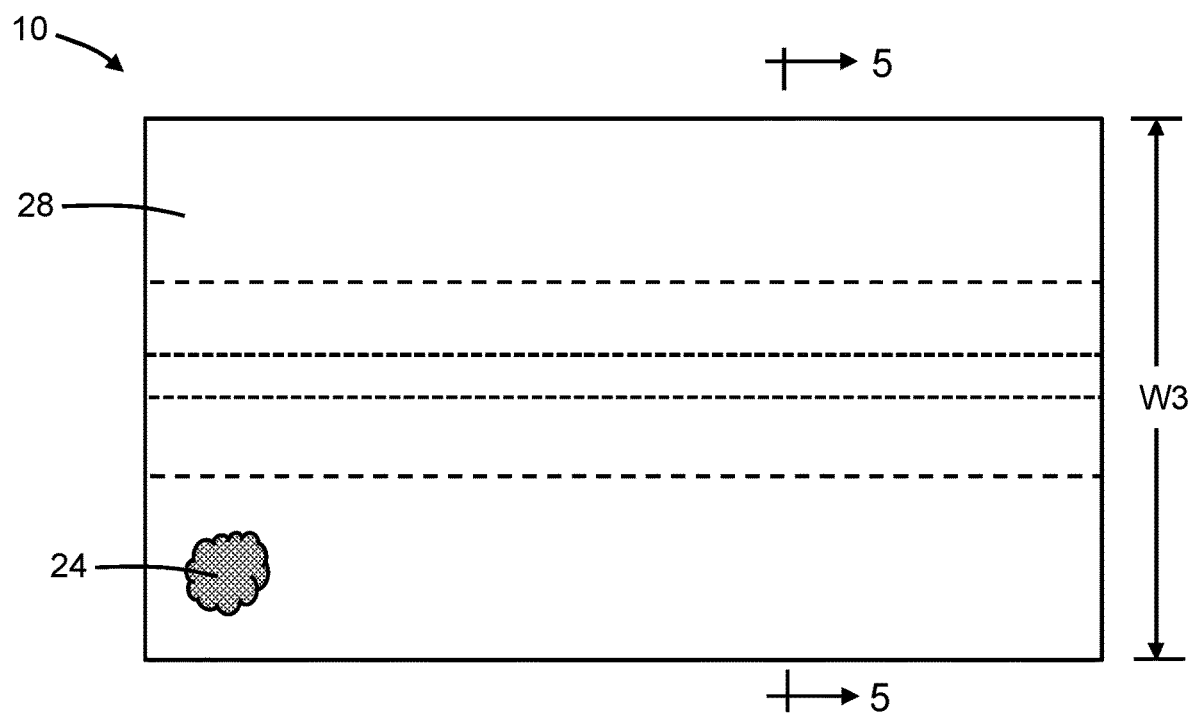
FIG. 5 is a top view of the structure at a fabrication stage of the processing method subsequent to FIGS. 3, 4.
Figure 6:
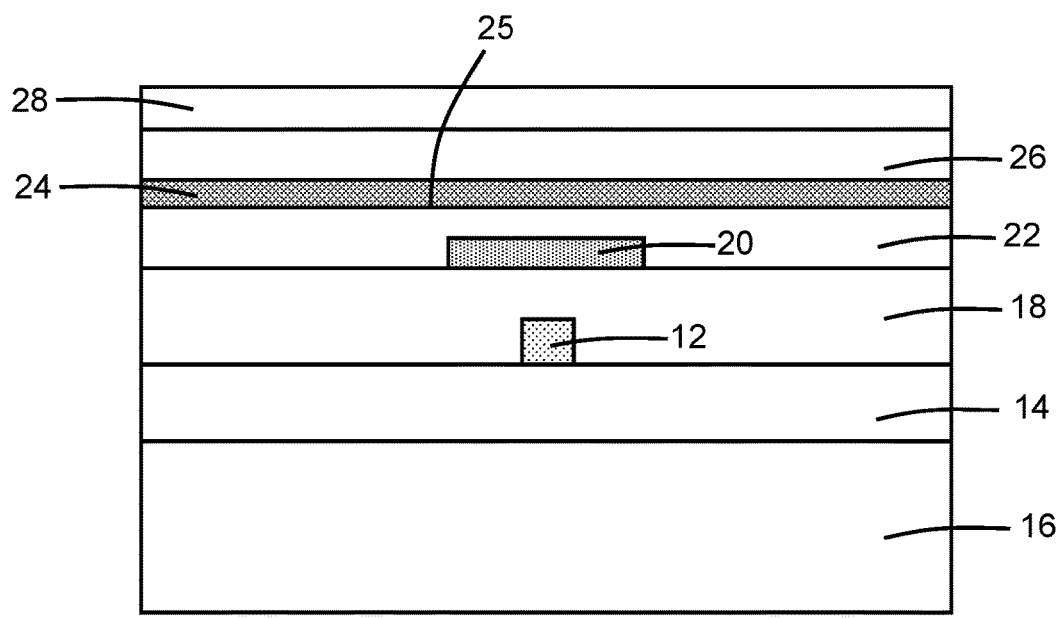
FIG. 6 is a cross-sectional view taken generally along line 6-6 in FIG. 5.

With reference to FIGS. 5, 6 in which like reference numerals refer to like features in FIGS. 3, 4 and at a subsequent fabrication stage, a dielectric layer 22 may be formed on, and over, the metal layer 20. The dielectric layer 22 may be comprised of a dielectric material, such as silicon dioxide. The metal layer 20 may be embedded in the dielectric material of the dielectric layer 22.

A layer 24 may be disposed on the dielectric layer 22. The layer 24 may be carried on a dielectric layer 26 and a substrate 28. In an embodiment, the dielectric layer 26 may be comprised of a dielectric material, such as silicon dioxide, having a refractive index that is less than the refractive index of the layer 24, and the substrate 28 may be comprised of silicon, lithium niobate, quartz, or fused silica. The layer 24 may be bonded to the dielectric layer 22 by a bonding process, such as dielectric bonding or hybrid bonding. The layer 24 may adjoin the dielectric layer 22 along a bonding interface 25 that is disposed between the layer 24 and the dielectric layer 22. The layer 24 may be formed on the dielectric layer 26 and substrate 28, and the substrate 28 may be manipulated to place the layer 24 in a contacting relationship with the dielectric layer 22 in advance of the bonding process. In an embodiment, after the contacting relationship is established, a low-temperature thermal anneal may be performed at a sufficient temperature and for a sufficient duration to create a face-to-face bond along the bonding interface 25 between the contacting surfaces of the dielectric layer 22 and the layer 24. In an embodiment, the bonding interface 25 may lack any additional material, such as an adhesive, to promote the bonding between the surface of the dielectric layer 22 and the surface of the layer 24.

In an embodiment, the layer 24 may be comprised of a material that exhibits an electric-field-induced Pockels effect in which the refractive index varies in proportional to the strength of an applied electric field according to an electro-optic coefficient. In an embodiment, the layer 24 may be comprised of a crystalline material that lacks inversion symmetry and that is characterized by an optic axis whose refractive index is controllable by an applied electric field. In an embodiment, the layer 24 may be comprised of lithium niobate. In an embodiment, the layer 24 may be comprised of thin film lithium niobate having a thickness in a range of 300 nanometers to 900 nanometers. In alternative embodiments, the layer 24 may be comprised of lithium tantalate, lithium niobate doped with magnesium oxide, or barium titanate. In alternative embodiments, the layer 24 may be comprised of a binary or ternary III-V compound semiconductor material, such as gallium nitride, indium gallium nitride, indium phosphide, indium gallium arsenide, gallium arsenide, indium arsenide, or indium gallium phosphide. The layer 24 may have a width dimension W3 that is greater than the width dimension W1 of the waveguide core 12 and that is greater than the width dimension W2 of the metal layer 20.

The dielectric material of the dielectric layer 22 separates the layer 24 from the metal layer 20 and prevents direct contact therebetween. The combination of the layer 24, the metal layer 20, and the intervening dielectric material of the dielectric layer 22 defines a hybrid plasmonic waveguide. In that regard, the proximity of the layer 24 and the metal layer 20 provides a mode supported by the layer 24 and a separate mode supported at the adjacent surface of the metal layer 20. The dielectric material of the dielectric layer 18 separates the waveguide core 12 from the metal layer 20 and prevents direct contact therebetween. The combination of the waveguide core 12, the metal layer 20, and the intervening dielectric material of the dielectric layer 22 defines a hybrid plasmonic waveguide. In that regard, the proximity of the waveguide core 12 and the metal layer 20 provides a mode supported by the waveguide core 12 and a separate mode supported at the adjacent surface of the metal layer 20.

Figure 7:
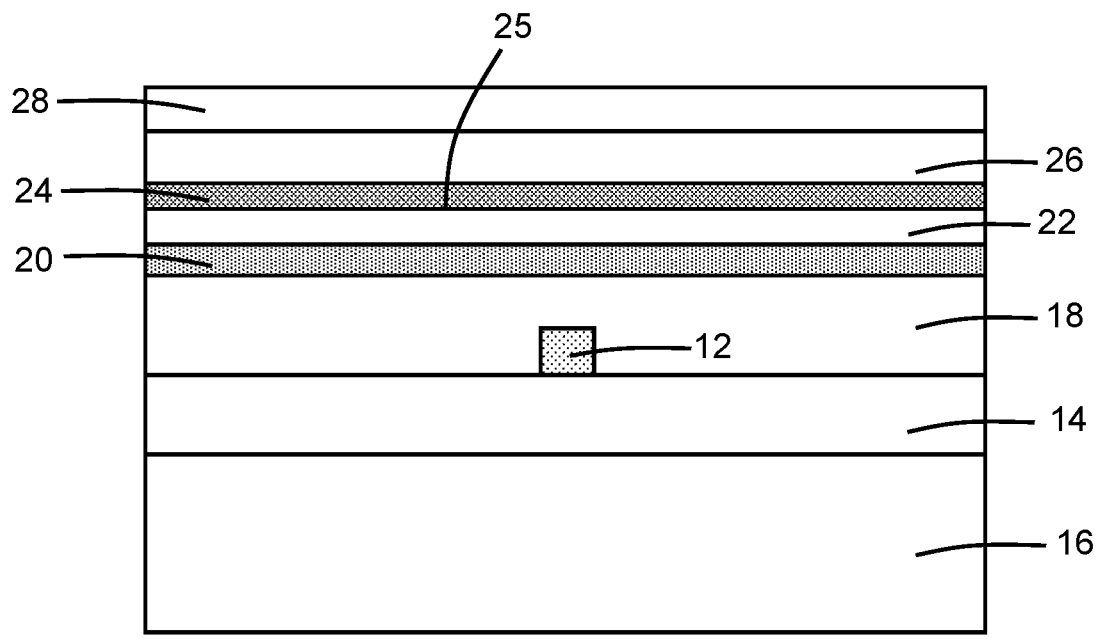
FIG. 7 is a cross-sectional view of a structure in accordance with alternative embodiments of the invention.

With reference to FIG. 7 and in accordance with alternative embodiments, the width dimension W2 of the metal layer 20 may be increased to be, for example, equal to the width dimension W3 of the layer 24 such that the metal layer 20 and the layer 24 are coterminous. The dielectric layer 22 may be disposed in its entirety on, and over, metal layer 20.

Figure 8:
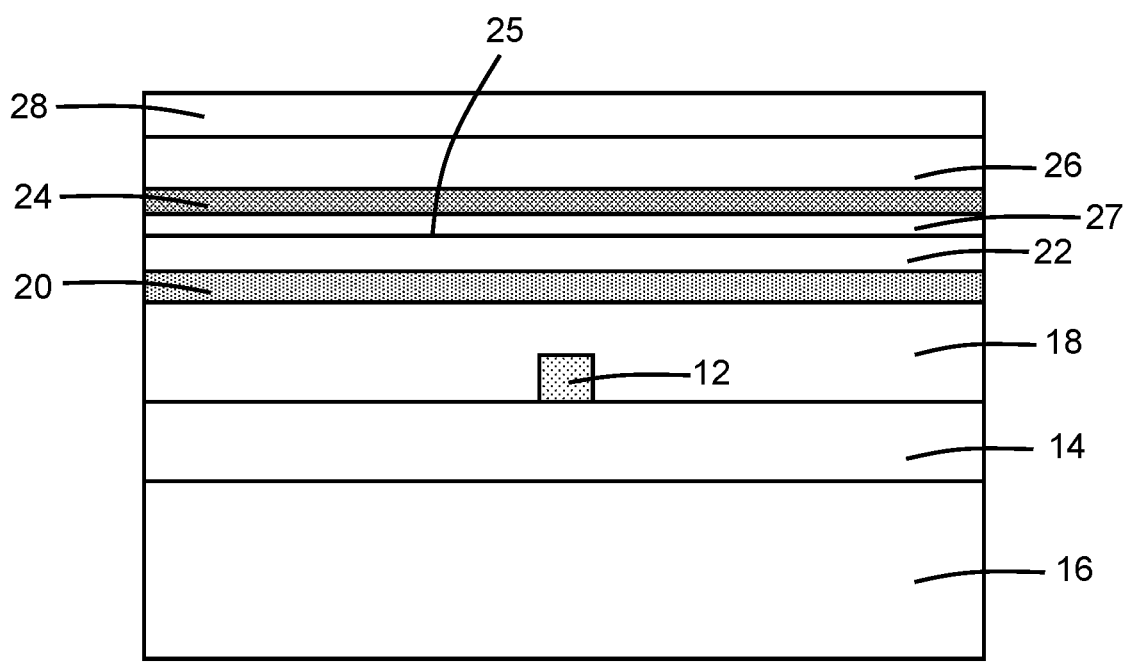
FIG. 8 is a cross-sectional view of a structure in accordance with alternative embodiments of the invention.

With reference to FIG. 8 and in accordance with alternative embodiments, a dielectric layer 27 may be formed on the layer 24 before the bonding process is performed. As a result, the bonding interface 25 is formed between the contacting surfaces of the dielectric layer 22 and the dielectric layer 27, and the layer 24 is separated from the metal layer 20 by the dielectric material of the dielectric layer 27 in addition to the dielectric material of the dielectric layer 22.

Figure 9:
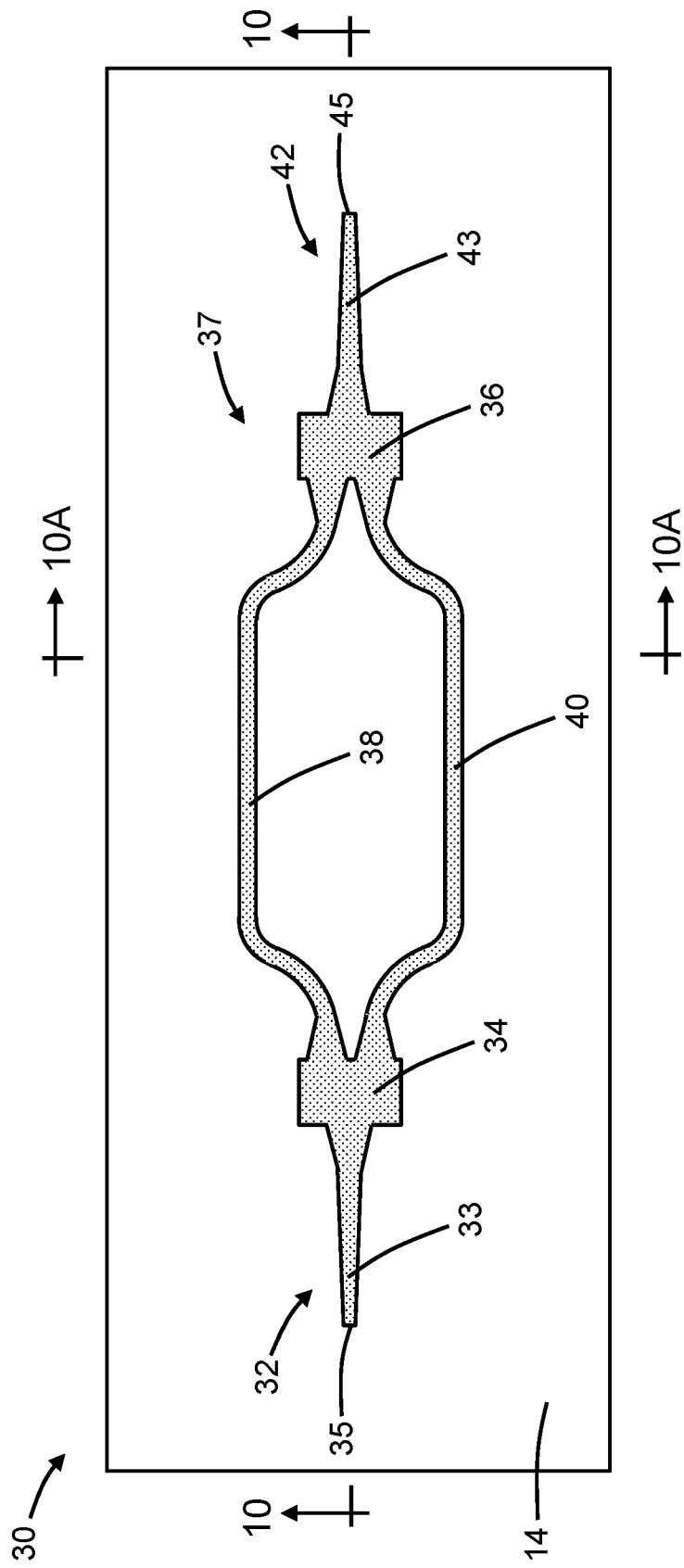
FIG. 9 is a top view of a structure at an initial fabrication stage of a processing method in accordance with embodiments of the invention.
Figure 10:
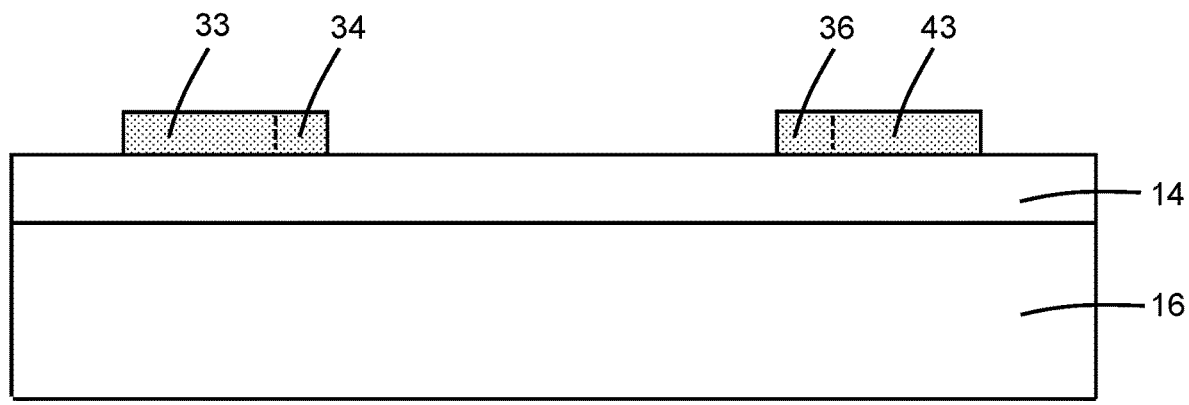
FIG. 10 is a cross-sectional view taken generally along line 10-10 in FIG. 9.
Figure 10A:
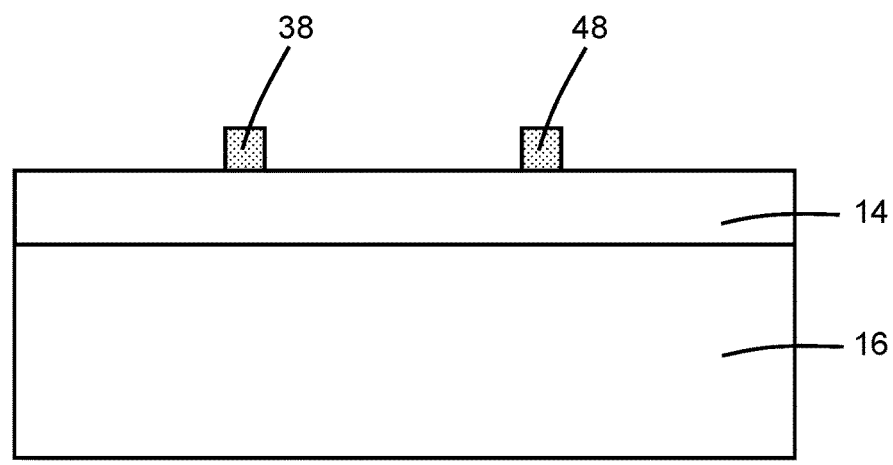
FIG. 10A is a cross-sectional view taken generally along line 10A-10A in FIG. 9.

With reference to FIGS. 9, 10, 10A and in accordance with alternative embodiments, a structure 30 for a photonics chip includes an edge coupler 32, an input optical coupler 34 connected to the edge coupler 32, an output optical coupler 36, and waveguide cores 38, 40 defining arms that are separately routed from the input optical coupler 34 to the output optical coupler 36, and an edge coupler 42 connected to the output optical coupler 36. The input optical coupler 34, output optical coupler 36, and waveguide cores 38, 40 define portions of a modulator 37. The edge coupler 32, input optical coupler 34, output optical coupler 36, waveguide cores 38, 40, and edge coupler 42 may be disposed on, and over, the dielectric layer 14 and the substrate 16. In an alternative embodiment, may one or more additional dielectric layers comprised of, for example, silicon dioxide may be positioned between the edge coupler 32, input optical coupler 34, output optical coupler 36, waveguide cores 38, 40, and edge coupler 42 and the top surface of the dielectric layer 14.

In an embodiment, the edge coupler 32, input optical coupler 34, output optical coupler 36, waveguide cores 38, 40, and edge coupler 42 may be comprised of a material having a refractive index that is greater than the refractive index of silicon dioxide. In an embodiment, the edge coupler 32, input optical coupler 34, output optical coupler 36, waveguide cores 38, 40, and edge coupler 42 may be comprised of a semiconductor material, such as single-crystal silicon, amorphous silicon, or polysilicon. In an alternative embodiment, the edge coupler 32, input optical coupler 34, output optical coupler 36, waveguide cores 38, 40, and edge coupler 42 may be comprised of a dielectric material, such as silicon nitride, silicon oxynitride, or aluminum nitride. In alternative embodiments, other materials, such as a III-V compound semiconductor, may be used to form the edge coupler 32, input optical coupler 34, output optical coupler 36, waveguide cores 38, 40, and edge coupler 42.

In an embodiment, the edge coupler 32, input optical coupler 34, output optical coupler 36, waveguide cores 38, 40, and edge coupler 42 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shapes of the edge coupler 32, input optical coupler 34, output optical coupler 36, waveguide cores 38, 40, and edge coupler 42. In an embodiment, the edge coupler 32, input optical coupler 34, output optical coupler 36, waveguide cores 38, 40, and edge coupler 42 may be formed by patterning the semiconductor material (e.g., single-crystal silicon) of the device layer of a silicon-on-insulator substrate. In an embodiment, the edge coupler 32, input optical coupler 34, output optical coupler 36, waveguide cores 38, 40, and edge coupler 42 may be formed by patterning a deposited layer comprised of their constituent material (e.g., silicon nitride). In an alternative embodiment, each of the waveguide cores 38, 40 may be slotted.

The input optical coupler 34 has an input port coupled to the edge coupler 32 and output ports respectively coupled to the waveguide cores 38, 40. The input optical coupler 34 splits the input light supplied from the edge coupler 32 between the waveguide core 38 and the waveguide core 40. In an embodiment, the input optical coupler 34 may be a 50-50 directional coupler that splits the input light evenly between the waveguide cores 38, 40. The output optical coupler 36 has an output port coupled to the edge coupler 42 and input ports coupled to the waveguide cores 38, 40. The output optical coupler 36 combines the light received from the waveguide cores 38, 40 and may also be a 50-50 directional coupler to match the input optical coupler 34. In an embodiment, the input optical coupler 34 and output optical coupler 36 may be configured as multi-mode interference couplers each having a multi-mode interference region.

The edge coupler 32 may include a tapered section 33 of a waveguide core that is connected to the input optical coupler 34. The tapered section 33 of the edge coupler 32 terminates at a facet 35. The tapered section 33 may have a width dimension that increases with increasing distance from the facet 35. In an embodiment, the width dimension of the tapered section 33 may increase linearly with increasing distance from the facet 35. In an alternative embodiment, the width dimension of the tapered section 33 may vary based on a non-linear function, such as a quadratic function, a cubic function, a parabolic function, a sine function, a cosine function, a Bezier function, or an exponential function. In an embodiment, the tapered section 33 may include a single stage of tapering characterized by a taper angle. In an alternative embodiment, the tapered section 33 may taper in multiple stages each characterized by a different taper angle.

The edge coupler 42 may include a tapered section 43 of a waveguide core that is connected to the input optical coupler 34. The tapered section 43 of the edge coupler 42 terminates at a facet 45. The tapered section 43 may have a width dimension that increases with increasing distance from the facet 45. In an embodiment, the width dimension of the tapered section 43 may increase linearly with increasing distance from the facet 45. In an alternative embodiment, the width dimension W2 of the tapered section 43 may vary based on a non-linear function, such as a quadratic function, a cubic function, a parabolic function, a sine function, a cosine function, a Bezier function, or an exponential function. In an embodiment, the tapered section 43 may include a single stage of tapering characterized by a taper angle. In an alternative embodiment, the tapered section 43 may taper in multiple stages each characterized by a different taper angle.

In alternative embodiment, the edge couplers 32, 42 may have a different configuration. For example, the edge couplers 32, 42 may be divided into segments. As another example, the edge couplers 32, 42 may include sections that are arranged to provide multiple tips. As another example, the edge couplers 32, 42 may include sections that are arranged in different levels.

The waveguide cores 38, 40 include bends adjacent to the input optical coupler 34 that increase the separation between the waveguide cores 38, 40 and decrease crosstalk between the arms of the modulator 37. The waveguide cores 38, 40 include bends adjacent to the output optical coupler 36 that decrease the separation between the waveguide cores 38, 40 to converge at the output optical coupler 36.

Figure 11:
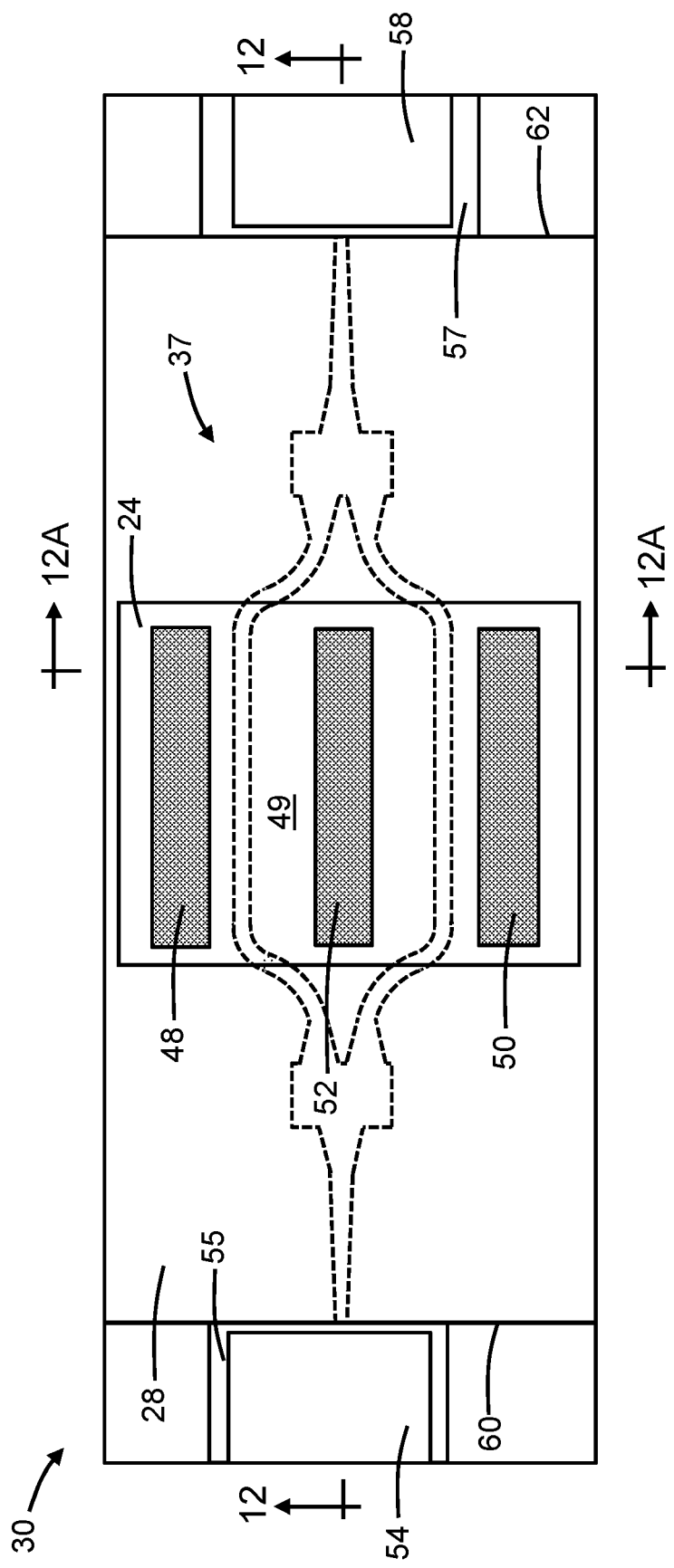
FIG. 11 is a top view of the structure at a fabrication stage of the processing method subsequent to FIGS. 9, 10, 10A.
Figure 12:
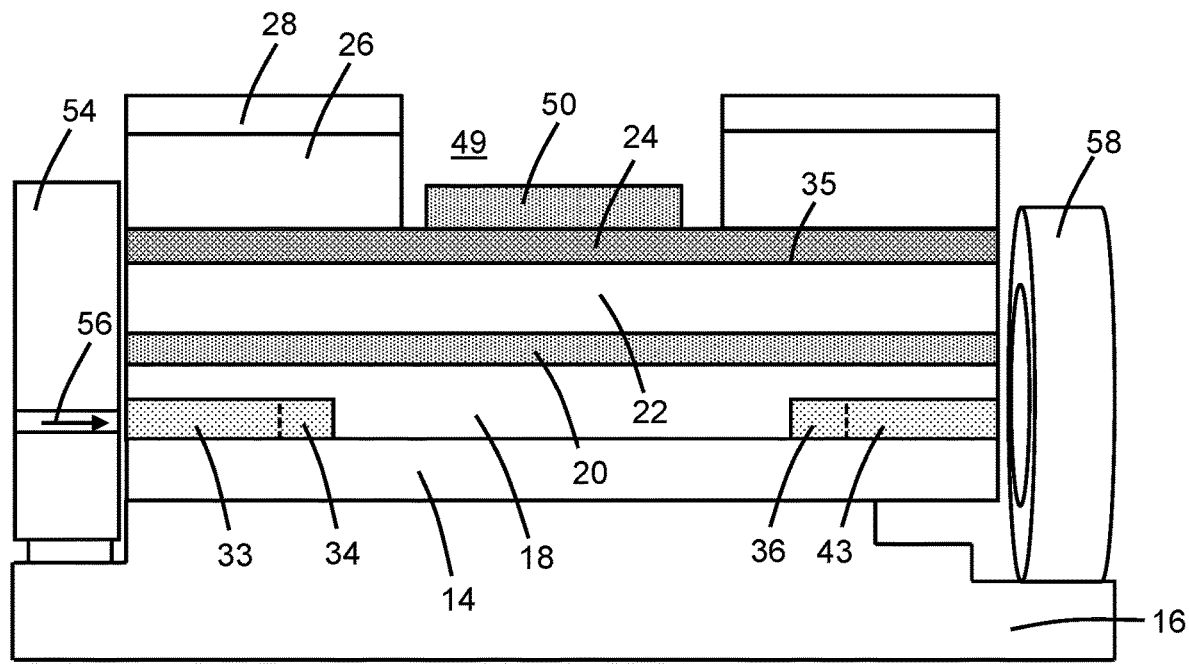
FIG. 12 is a cross-sectional view taken generally along line 12-12 in FIG. 11.
Figure 12A:
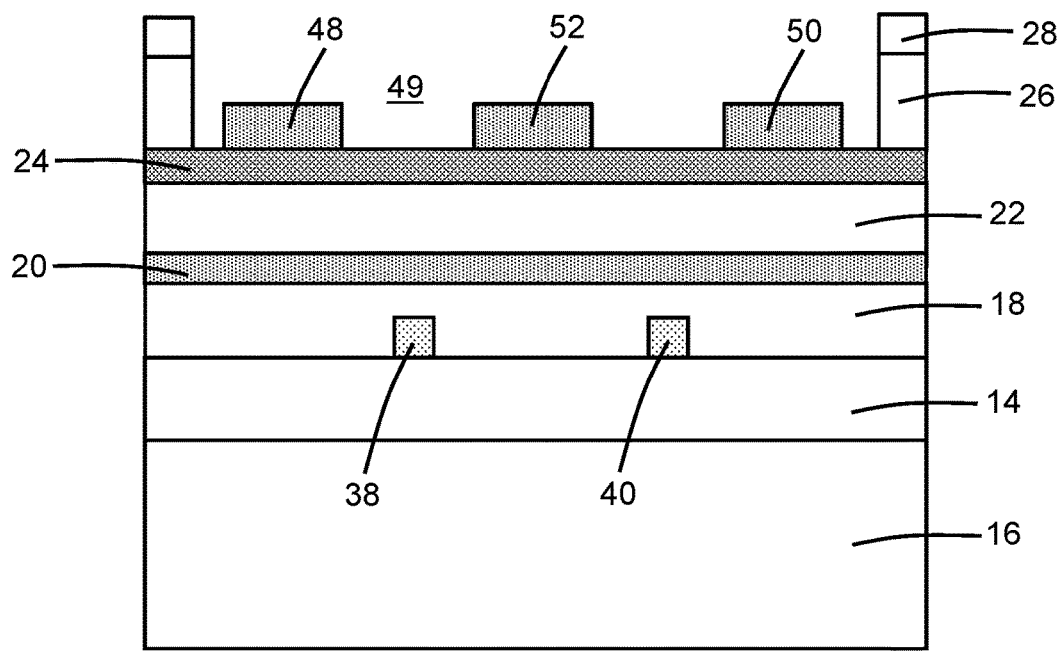
FIG. 12A is a cross-sectional view taken generally along line 12A-12A in FIG. 11.

With reference to FIGS. 11, 12, 12A in which like reference numerals refer to like features in FIGS. 9, 10, 10A and at a subsequent fabrication stage, the dielectric layer 18, the metal layer 20, and the dielectric layer 22 may be formed over the edge coupler 32, input optical coupler 34, output optical coupler 36, waveguide cores 38, 40, and edge coupler 42. The layer 24 may be bonded to the dielectric layer 22 by a bonding process that establishes the bonding interface 25 between the layer 24 and the dielectric layer 22 such that the layer 24, dielectric layer 26, and substrate 28 are bonded to the dielectric layer 22.

The structure 30 may include an electrode 48, an electrode 50, and an electrode 52 that is disposed with a juxtaposed relationship between the electrode 48 and the electrode 50. The electrodes 48, 50, 52 may be positioned on a portion of the layer 24 inside a cavity 49 that is patterned by lithography and etching processes in the dielectric layer 26 and substrate 28. The electrodes 48, 50, 52 may be comprised of a metal, such as gold, that is deposited and patterned by lithography and etching processes. In an embodiment, the metal layer 20 may be comprised of a different metal than the electrodes 48, 50, 52. In an alternative embodiment, the metal layer 20 may be comprised of the same metal as the electrodes 48, 50, 52. The modulator 37 further includes the electrodes 48, 50, 52, the portion of the layer 24 on which the electrodes 48, 50, 52 are located, and the metal layer 20, in addition to the input optical coupler 34, the output optical coupler 36, and waveguide cores 38, 40.

In an embodiment, the cavity 49 may extend to the layer 24 and the electrodes 48, 50, 52 may directly contact the portion of the layer 24 inside the cavity 49. In an embodiment, the cavity 49 may extend partially through the dielectric layer 26 and the electrodes 48, 50, 52 may contact the residual thickness of the dielectric layer 26. An underlying portion of the waveguide core 38 is disposed in a lateral direction between the electrode 48 and the electrode 52. An underlying portion of the waveguide core 40 is disposed in a lateral direction between the electrode 50 and the electrode 52. The electrode 52 may be coupled to a signal source, such as a driver that is configured to supply radiofrequency signals to the electrode 52 in order to modulate the light propagating in the waveguide cores 38, 40 of the modulator 37. The electrode 48 and the electrode 50 may be coupled to electrical ground.

A light source 54 may be placed adjacent to the edge coupler 32. In an embodiment, the light source 54 includes a light output 56 that is aimed toward the facet 35 of the tapered section 33 of the edge coupler 32 and that is configured to provide light in a mode propagation direction toward the edge coupler 32. In an embodiment, the light source 54 may be a laser chip that includes a semiconductor laser configured to emit light (e.g., laser light) of a given wavelength, intensity, mode shape, and mode size from the light output 56 that is coupled to the edge coupler 32. In an embodiment, the light source 54 may output coherent light in an infrared wavelength range. In an alternative embodiment, the light source 54 may be a single-mode or multimode optical fiber.

The light source 54 may be disposed inside a cavity 55 in the substrate 16 that is formed adjacent to the facet 35 of the edge coupler 32. In an alternative embodiment, an undercut may extend in the substrate 16 from the cavity 55 beneath the edge coupler 32 such that a portion of the dielectric layer 14 defines a membrane that supports the edge coupler 32 over the undercut. In an alternative embodiment, a sealed undercut may be provided in the substrate 16 beneath the waveguide cores 38, 40 of the modulator 37.

An optical fiber 58 may be placed adjacent to the edge coupler 42. The optical fiber 58 is configured to receive modulated light output from the facet 45 of the tapered section 43 of the edge coupler 42 and to route the modulated light away from the edge coupler 42. For example, the optical fiber 58 may route the modulated light output from the edge coupler 42 over a long distance to a remote receiver. The optical fiber 58 may be disposed inside a groove 57 in the substrate 16 that is formed adjacent to the facet 45 of the edge coupler 42. In an alternative embodiment, an undercut may extend in the substrate 16 from the groove 57 beneath the edge coupler 42 such that a portion of the dielectric layer 14 defines a membrane that supports the edge coupler 42 over the undercut.

In an embodiment, the metal layer 20 and the layer 24 may fully overlap with the edge coupler 32, input optical coupler 34, output optical coupler 36, waveguide cores 38, 40, and edge coupler 42. In an embodiment, the metal layer 20 and the layer 24 may have a side edge 60 that is disposed adjacent to the facet 35 at the end of the tapered section 33 of the edge coupler 32. In an embodiment, the metal layer 20 and the layer 24 may have a side edge 62, which is opposite from the side edge 60, that is disposed adjacent to the facet 45 at the end of the tapered section 43 of the edge coupler 42. In an embodiment, the side edge 60 and the facet 35 may be coterminous. In an embodiment, the side edge 60 and the facet 35 may be substantially coterminous. In an embodiment, the side edge 62 and the facet 45 may be coterminous. In an embodiment, the side edge 62 and the facet 45 may be substantially coterminous.

The structure 30 may define a transmitter in which the modulator 37 is configured to modulate light, such as continuous infrared light, received from the light source 54 via the edge coupler 32 and to output the modulated light via the edge coupler 42 to the optical fiber 58 for transmission to a remote location. In use, the edge coupler 32 may receive light from the light source 54 as input to the structure 30. The input optical coupler 34 splits the input light between the waveguide cores 38, 40. A radiofrequency signal may be applied as a highspeed data signal to the electrode 52. The output optical coupler 36 combines the light exiting the waveguide cores 38, 40 to provide either constructive or destructive interference according to the value of the phase difference. Light may be output from the output optical coupler 36 to the edge coupler 42 due to constructive interference if the phase delay is zero or not output due to destructive interference if the phase difference is equal to one-half wavelength.

The inclusion of the metal layer 20 in the modulator 37 may enable the formation of the modulator 37, which includes the layer 24, on a monolithic platform. The modulator 37 may exhibit an improved modulation efficiency with strengthened light confinement, a minimized insertion loss, and a lowered propagation loss due to the inclusion of the metal layer 20. The dielectric material of the dielectric layer 22 separates the layer 24 from the metal layer 20 and prevents direct contact therebetween. The combination of the metal layer 20, the layer 24, and the intervening dielectric material of the dielectric layer 22 defines a hybrid plasmonic waveguide. The dielectric material of the dielectric layer 18 separates each of the waveguide cores 38, 40 from the metal layer 20 and prevents direct contact therebetween. The combinations of the waveguide cores 38, 40, the metal layer 20, and the intervening dielectric material of the dielectric layer 18 define respective hybrid plasmonic waveguides.

Figure 13:
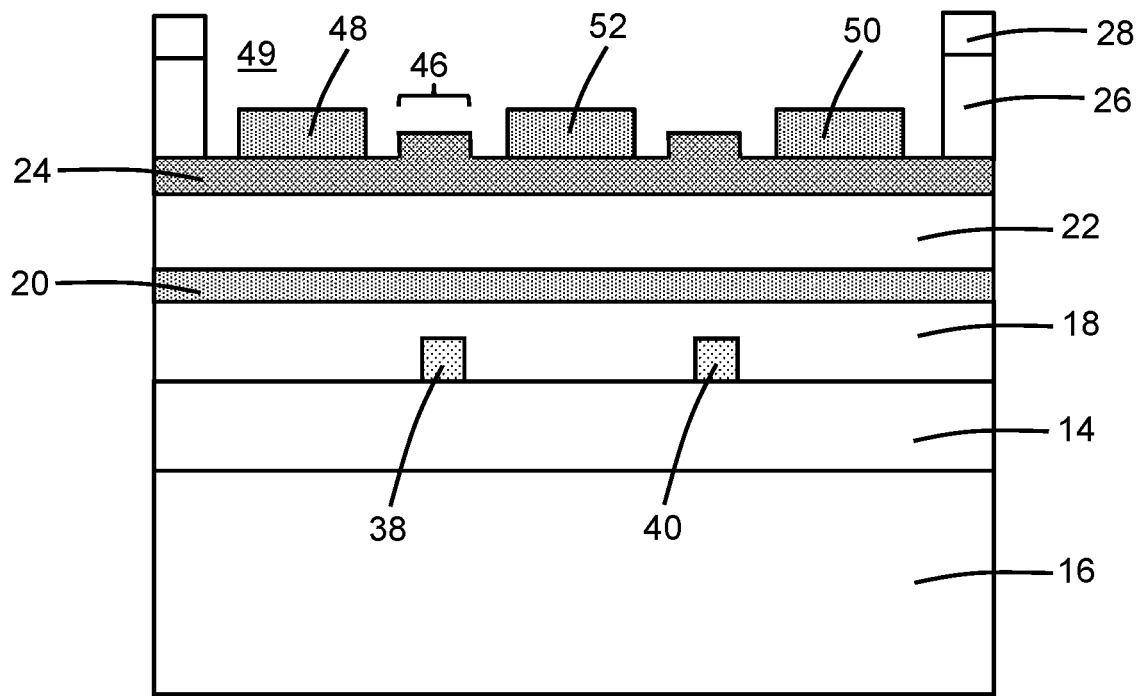
FIG. 13 is a cross-sectional view of a structure in accordance with alternative embodiments of the invention.

With reference to FIG. 13 and in accordance with alternative embodiments, the layer 24 may include ridges 46 that are disposed inside the cavity 49 between the electrodes 48, 50, 52. One of the ridges 46 may be disposed between the electrode 48 and the electrode 50, and the other of the ridges 46 may be disposed between the electrode 52 and the electrode 50. In an embodiment, one of the ridges 46 may overlap with a portion of the waveguide core 38, and one of the ridges 46 may overlap with a portion of the waveguide core 40. In an embodiment, the ridges 46 may extend from a side edge of the cavity 49 adjacent to the input optical coupler 34 to a side edge of the cavity 49 adjacent to the output optical coupler 36.

Figure 14:
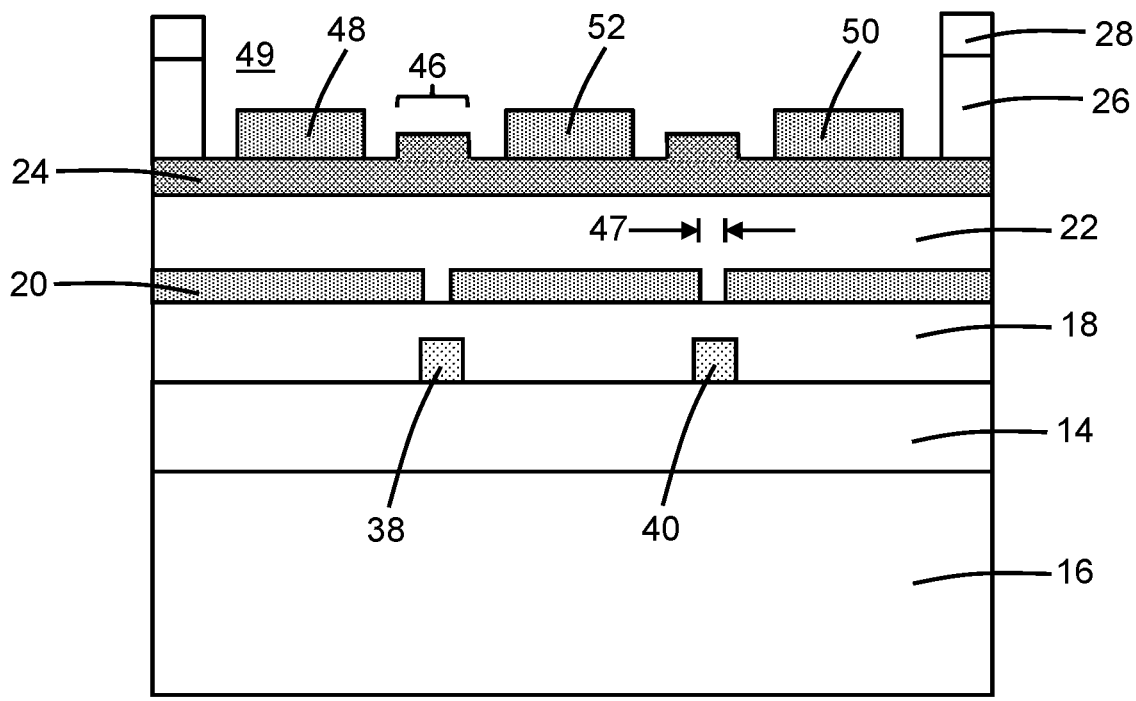
FIG. 14 is a cross-sectional view of a structure in accordance with alternative embodiments of the invention.

With reference to FIG. 14 and in accordance with alternative embodiments, the metal layer 20 may include slots 47 that introduce discontinuities. The slots 47 may be formed by patterning the metal layer 20 with lithography and etching processes. In an embodiment, each slot 47 may overlap with a portion of one of the waveguide cores 38, 40. In an embodiment, each ridge 46 in the layer 24 may overlap at least in part with one of the slots 47.

Figure 15:
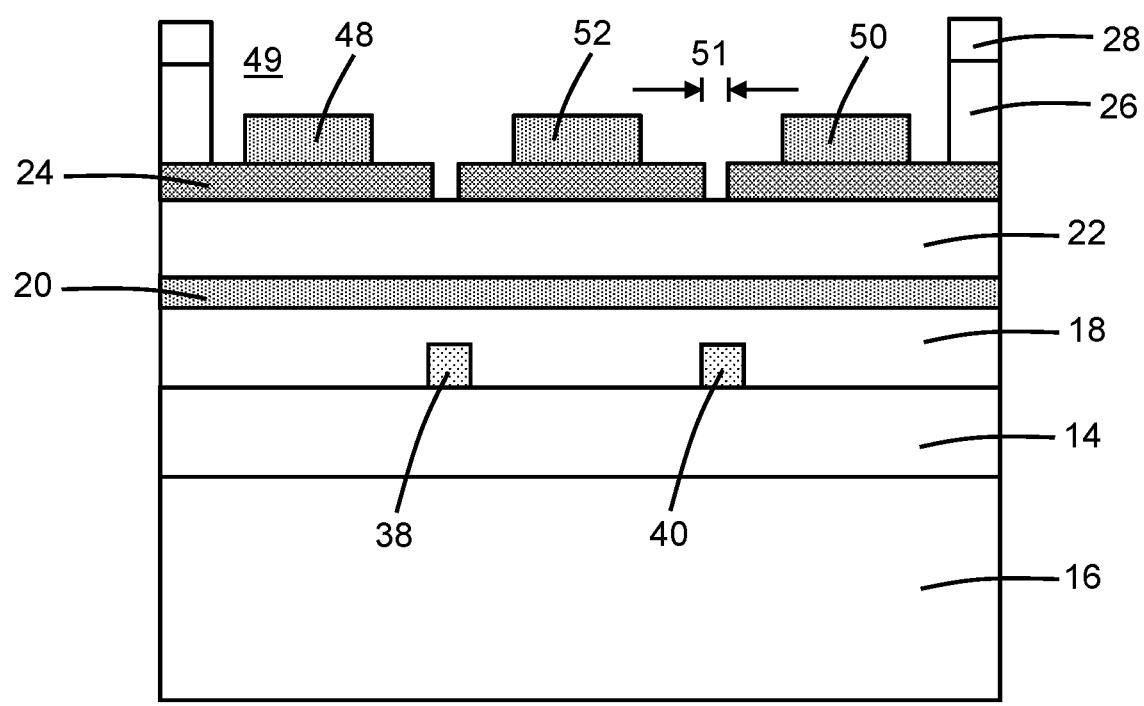
FIG. 15 is a cross-sectional view of a structure in accordance with alternative embodiments of the invention.

With reference to FIG. 15 and in accordance with alternative embodiments, the layer 24 may include slots 51 that introduce discontinuities. The slots 51 may be formed by patterning the layer 24 with lithography and etching processes. In an embodiment, each slot 51 may overlap with a portion of one of the waveguide cores 38, 40.

Figure 16:
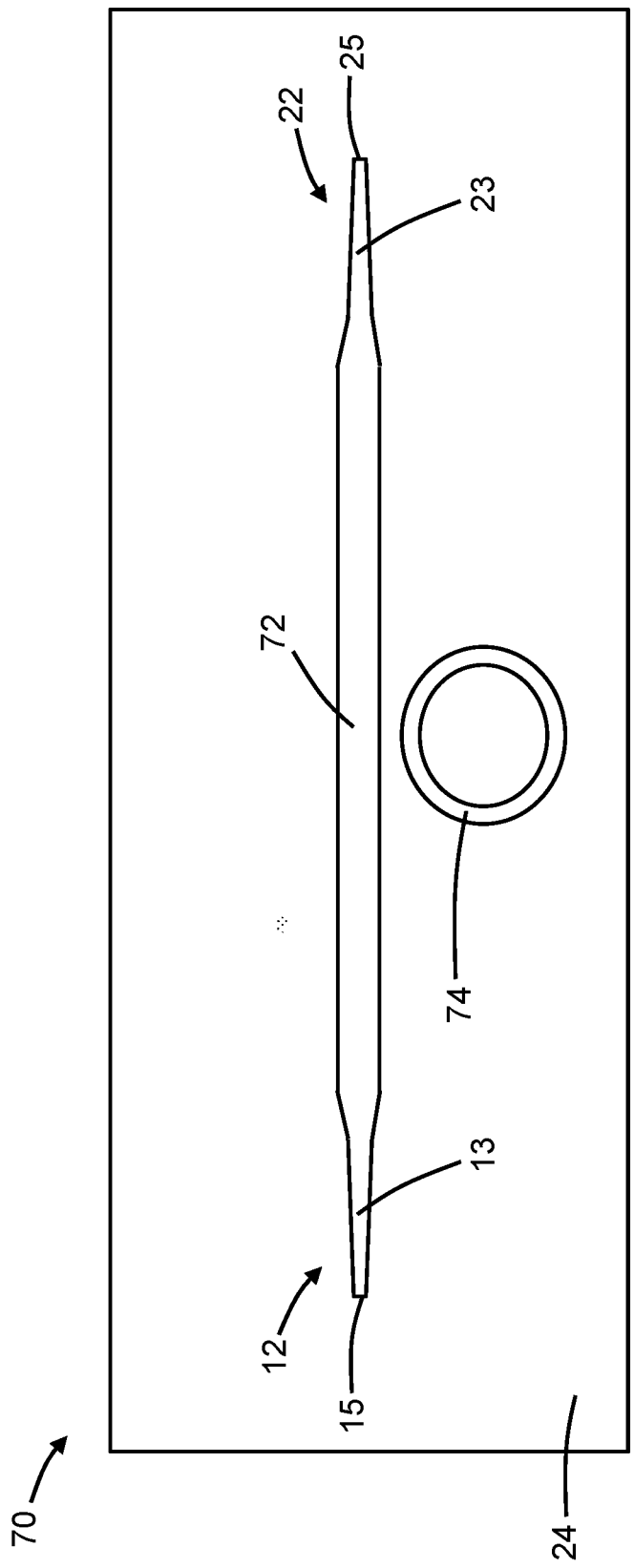
FIG. 16 is a top view of a structure in accordance with alternative embodiments of the invention.

With reference to FIG. 16 and in accordance with alternative embodiments, a structure 70 may include a waveguide core 72 that is disposed between the edge coupler 32 and the edge coupler 42, as well as a ring resonator 74 that is positioned adjacent to a portion of the waveguide core 72. In an embodiment, the ring resonator 74 may be separated from the adjacent portion of the waveguide core 72 by a gap. In an embodiment, the ring resonator 74 may be a waveguide core that is ring shaped or round. In an alternative embodiment, the ring resonator 74 may be a waveguide core that is racetrack shaped or oblong.

Figure 17:
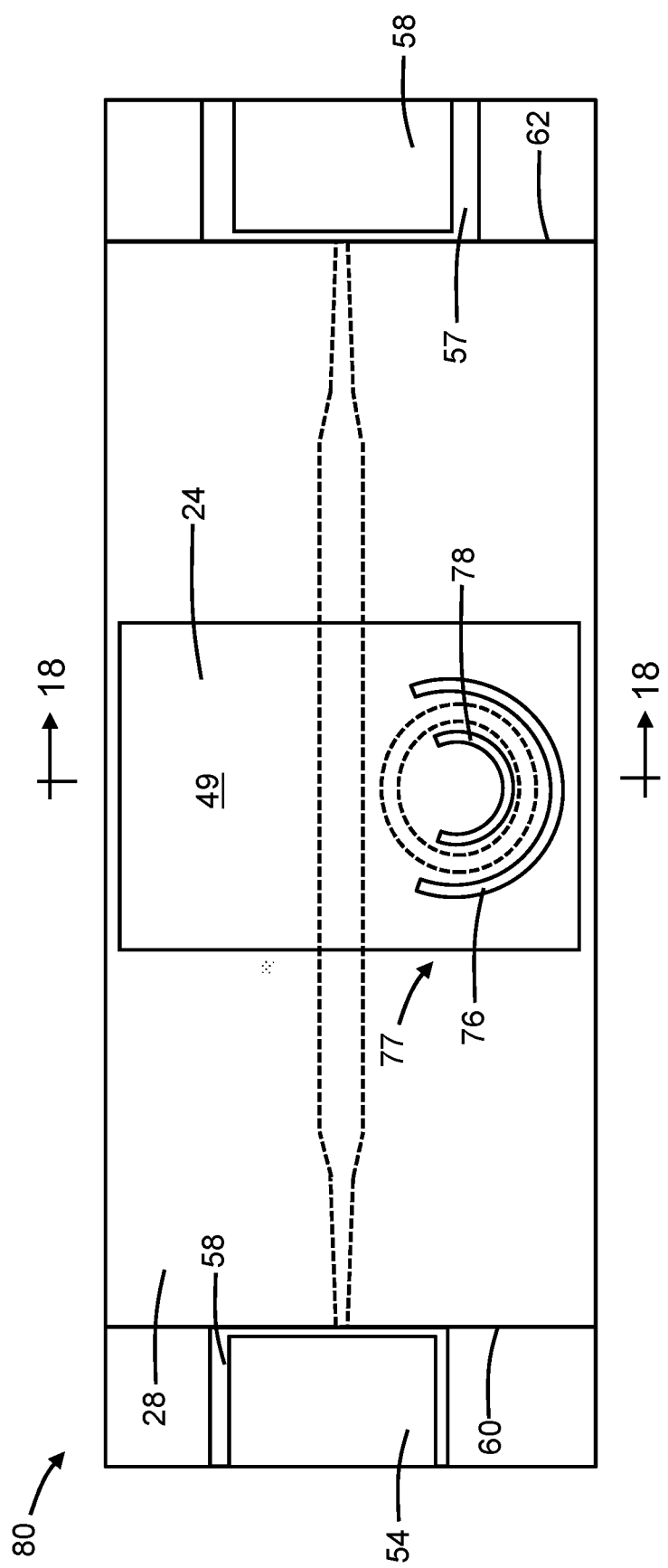
FIG. 17 is a top view of the structure at a fabrication stage of the processing method subsequent to FIG. 16.
Figure 18:
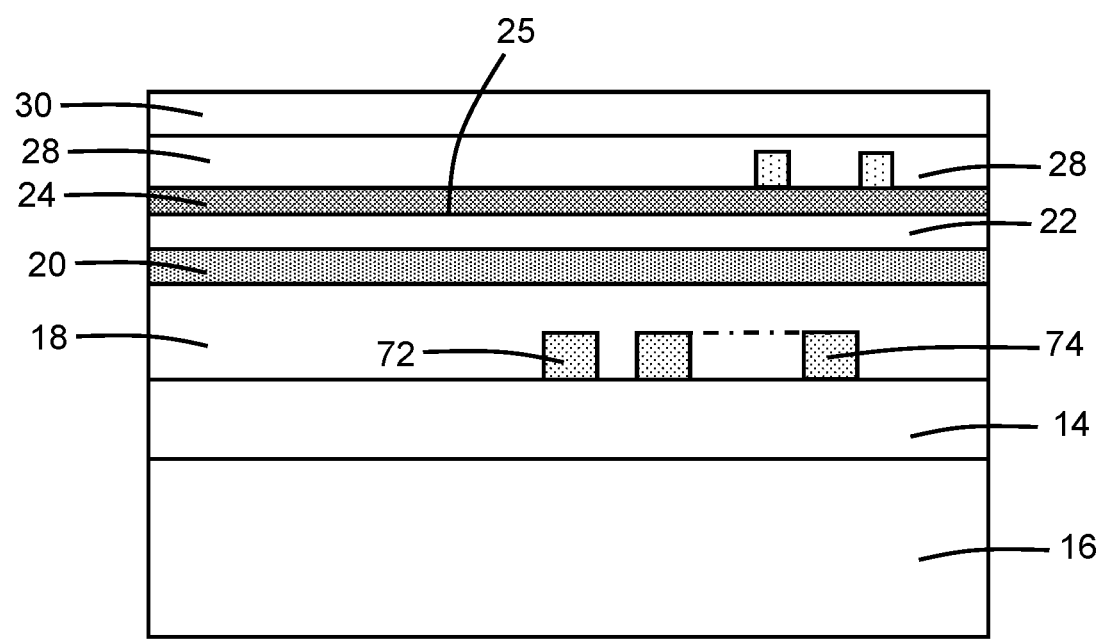
FIG. 18 is a cross-sectional view taken generally along line 18-18 in FIG. 17.

With reference to FIGS. 17, 18 in which like reference numerals refer to like features in FIG. 16 and at a subsequent fabrication stage, electrodes 76, 78 are formed on the layer 24. The electrodes 76, 78 may have truncated ring shapes with the underlying ring resonator 74 disposed between the electrode 76 and the electrode 78. The electrodes 76, 78 are disposed in a different elevation level of the structure 70 than the ring resonator 74 with the ring resonator 74 disposed in a vertical direction between the electrodes 76, 78 and the substrate 16. In an embodiment, the electrode 76 may be disposed outside the outer perimeter of the underlying ring resonator 74, and the electrode 78 may be disposed inside the inner perimeter of the underlying ring resonator 74. In an embodiment, the electrode 76 may be disposed outside the outer circumference of the underlying ring resonator 74, and the electrode 78 may be disposed inside the inner circumference of the underlying ring resonator 74. The ring resonator 74, the electrodes 76, 78, and the portion of the layer 24 between the ring resonator 74 and electrodes 76, 78 define a modulator 77 that can be used to switch the light propagating in the waveguide core 72. In an embodiment, the metal layer 20 may have an overlapping relationship with the edge couplers 32, 42, the waveguide core 72, and the ring resonator 74.

In use, light (e.g., laser light) propagating in the waveguide core 72 may be coupled and transferred in a lateral direction from the waveguide core 72 to the ring resonator 74. The electrode 76 may be coupled to a signal source, such as a driver that includes a driver amplifier that is configured to supply radiofrequency signals to the electrode 76 in order to modulate the light propagating in the waveguide core of the ring resonator 74. The electrode 78 may be coupled to electrical ground.

The modulator 77 may exhibit an improved modulation efficiency with strengthened light confinement, a minimized insertion loss, and a lowered propagation loss due to the inclusion of the metal layer 20.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
   a first substrate;
   a second substrate;
   a first waveguide core on the first substrate;
   a first layer that has an overlapping relationship with the first waveguide core, the first layer comprising a first metal;
   a second layer that has an overlapping relationship with the first waveguide core and the first layer, the second layer comprising a material that exhibits an electro-optic effect;
   a first dielectric layer on the second substrate, the second layer disposed on the first dielectric layer; and
   a second dielectric layer between the first layer and the second layer, the second dielectric layer adjoining the second layer along a bonding interface.

2. The structure of claim 1 further comprising:
   a second waveguide core on the first substrate,
   wherein the first layer has an overlapping relationship with the second waveguide core.

3. The structure of claim 2 further comprising:
   an input optical coupler; and
   an output optical coupler,
   wherein the first waveguide core and the second waveguide core are coupled to the input optical coupler, and the first waveguide core and the second waveguide core are coupled to the output optical coupler.

4. The structure of claim 3 further comprising:
a first edge coupler connected by the input optical coupler to the first waveguide core; and
a second edge coupler connected by the output optical coupler to the second waveguide core,
wherein the first layer has an overlapping relationship with the first edge coupler and the second edge coupler.

5. The structure of claim 4 further comprising:
a light source configured to supply light to the first edge coupler; and
an optical fiber configured to receive the light from the second edge coupler.

6. The structure of claim 4 wherein the second layer has an overlapping relationship with the first edge coupler and the second edge coupler.

7. The structure of claim 2 wherein the second layer includes a first ridge that overlaps with the first waveguide core, and the second layer includes a second ridge that overlaps with the second waveguide core.

8. The structure of claim 2 further comprising:
an electrode on the second layer, the electrode disposed in a lateral direction between a portion of the first waveguide core and a portion of the second waveguide core,
wherein the first layer and the second layer are disposed between the electrode and the first waveguide core.

9. The structure of claim 8 wherein the electrode comprises a second metal different from the first metal of the first layer.

10. The structure of claim 2 wherein the second layer includes a first slot that overlaps with the first waveguide core, and the second layer includes a second slot that overlaps with the second waveguide core.

11. The structure of claim 2 wherein the first layer includes a first slot that overlaps with the first waveguide core, and the first layer includes a second slot that overlaps with the second waveguide core.

12. The structure of claim 1 further comprising:
a ring resonator on the first substrate adjacent to a portion of the first waveguide core;
a first electrode on the second layer; and
a second electrode on the second layer,
wherein the ring resonator includes a portion disposed in a lateral direction between the first electrode and the second electrode, and the first layer and the second layer overlap with the ring resonator.

13. The structure of claim 1 wherein the material is lithium niobate, lithium tantalate, lithium niobate doped with magnesium oxide, or barium titanate.

14. The structure of claim 1 wherein the material is a III-V compound semiconductor.

15. A structure for a photonics chip, the structure comprising:
a substrate;
a waveguide core on the substrate;
a first layer that has an overlapping relationship with the waveguide core, the first layer comprising a metal;
a second layer that has an overlapping relationship with the waveguide core and the first layer, the second layer comprising a material that exhibits an electro-optic effect;
a first dielectric layer between the first layer and the second layer; and
a second dielectric layer between the first dielectric layer and the second layer,
wherein the second dielectric layer adjoins the first dielectric layer along a bonding interface.

16. A method of forming a structure for a photonics chip, the method comprising:
forming a waveguide core on a first substrate;
forming a first layer that has an overlapping relationship with the waveguide core, wherein the first layer comprises a metal;
forming a second dielectric layer over the first layer; and
forming a second layer that has an overlapping relationship with the waveguide core and the first layer, wherein the second layer comprises a material that exhibits an electro-optic effect,
wherein the second layer is formed on a second substrate, and the second layer is bonded to the second dielectric layer along a bonding interface between the first substrate and the second substrate.

* * * * *